April 29, 1947.　　　T. L. GOTTIER　　　2,419,772

PULSE GENERATOR SYSTEM

Filed June 30, 1944

INVENTOR
THOMAS L. GOTTIER.
BY
ATTORNEY

Patented Apr. 29, 1947

2,419,772

UNITED STATES PATENT OFFICE 2,419,772

PULSE GENERATOR SYSTEM

Thomas L. Gottier, Princeton, N. J., assignor to Radio Corporation of America, a corporation of Delaware Application June 30, 1944, Serial No. 542,955

7 Claims. (Cl. 250—36)

This invention relates to pulse generators and has for its primary object to produce a stable pulse generator of substantially rectangular wave form pulses.

The following is a detailed description of the invention in conjunction with a drawing wherein.

Figure 1:
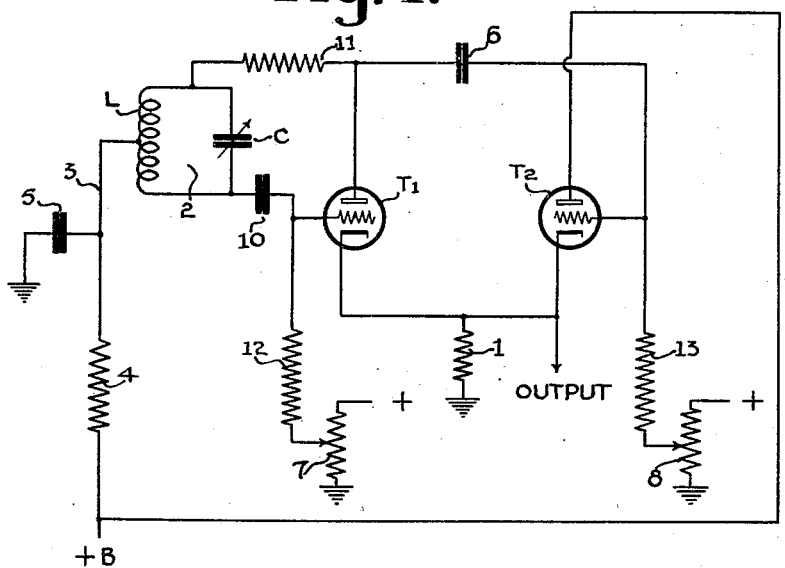
Fig. 1 illustrates a pulse generator in accordance with the invention.

Referring to Fig. 1, there is shown a pulse generator or oscillator system comprising a pair of triode vacuum tubes T1 and T2. Although electrode structures T1 and T2 are shown enclosed in separate envelopes, it should be understood that both electrode structures can be enclosed within a single evacuated envelope without interfering with the operation of the system. The grid and anode of tube T1 are, respectively, connected to opposite terminals of a parallel tuned circuit 2 via a condenser 10 and a resistor 11, while the cathode is, in effect, connected to an intermediate point on the inductance coil L of tuned circuit 2. The Q of the LC tuned circuit 2 is made large in order to maintain high frequency stability. Positive polarizing potential for the anode of T1 is supplied by a source of unidirectional potential +B to lead 3 through a resistor 4. A by-pass condenser 5 connects lead 3 to ground. Tube T1 therefor oscillates in a manner somewhat similar to a Hartley type oscillator. In order to present a high resistance at the anode of tube T1, condenser 5 is made to have a low value of capacitance, while the inductance coil L has a low value of inductance and the condenser C has a high value of capacitance. The impedance of the resistor-capacity network 4, 5 is made to be relatively high at the pulse frequencies.

It should be noted that the cathodes of both tubes T1 and T2 are directly connected together and in circuit with a common cathode resistor 1.

The anode of tube T1 is coupled to the grid of tube T2 through a condenser 6. The grids of tubes T1 and T2 are coupled via resistors 12 and 13, respectively, to taps on potentiometers 7 and 8, as shown. These potentiometers are connected between ground and the positive terminal of a source of low value direct current voltage, to thereby supply small positive potentials to the grids.

The operation of the system of Fig. 1 will now be explained. Tube T1 normally functions as an oscillation generator in a manner somewhat similar to a Hartley oscillator. Tube T2 is normally biased to the anode current cut-off condition (due to current flowing through tube T1 as explained more fully hereinafter) except for a short time during which it is conductive, and this conductive time of T2 is short compared to the non-conductive time. In this way tube T2 serves to produce pulses which are short in duration relative to the time intervals between pulses. The ratio of pulse frequency obtained from T2 to the oscillator frequency of T1 can be changed by changing the adjustment of the grid taps on potentiometers 7 and 8.

Let us assume that tube T2 has just become conductive due in part to a positive peak of voltage from the anode of tube T1. As a result of T2 becoming conductive, current will flow through the common cathode resistor 1 and cause an IR drop to build up therein of such magnitude as to bias T1 to cut off for a very short interval of time. The cessation of current through T1 will momentarily raise the magnitude of the positive voltage on the anode of tube T1 and thus drive the grid of T2 more positive through the feedback of coupling condenser 6, and hence more current will flow through tube T2. Condenser 6 will become charged to a maximum value, and then the charge will start to leak off as a result of which the current in T2 will decrease. This decrease in current in T2 will cause a reduction in the IR drop in cathode resistor 1 until a point is reached where T1 again passes current. The flow of current in T1 causes a decrease in the positive voltage on the anode of T1. This decrease in voltage on the anode of T1 makes itself felt through coupling condenser 6 upon the grid of T2 as an effective negative feedback, thus causing T2 to cease conducting. Due to this negative feedback, condenser 6 will be charged negatively and will prevent tube T2 from drawing current until such time as the charge on condenser 6 has leaked off to such an extent that a positive peak of voltage from tube T1 will be sufficient to raise the grid voltage of T2 above the cut-off point. The above cycle of operations will then repeat themselves.

Figure 2:
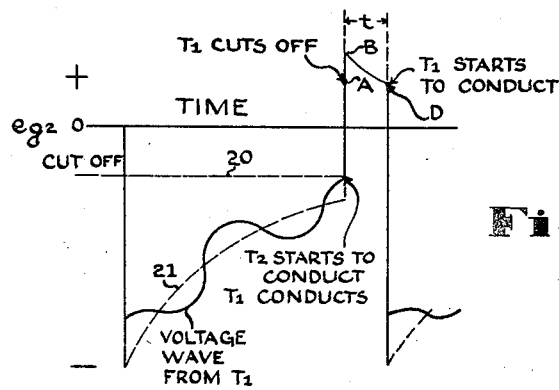
Figs. 2 and 3 are graphs given to explain the operation of the system of Fig. 1.
Figure 3:
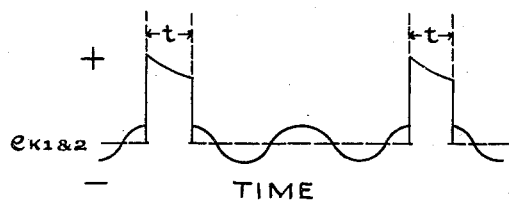

Figs. 2 and 3 graphically illustrate the operation of the system of Fig. 1. In Fig. 2 the voltage on the grid of tube T2 ($e_{g2}$) is plotted against time. The horizontal dash line 20 below the zero mark represents the critical grid voltage cut-off point below which current ceases to flow in tube T2. The curved dash line 21 extending from a high negative value at the bottom of Fig. 2 to a point near the cut-off line represents the normal rise in grid potential as the charge on condenser 6 leaks off, in the absence of oscillations from tube T1. It will be seen that when the grid voltage reaches a point near the critical cut-off value, a positive peak of voltage from T1 will raise the voltage on the grid of T2 above the cut-off point and thus cause T2 to conduct for a time interval $t$. At a point A, tube T1 will cut off (the flow of anode current in T1 ceases), but the grid voltage on T2 will continue to rise to point B, due to the rise in voltage on the anode of T1 and the feedback circuit. From point B to point D the voltage decreases, due to the charge on condenser 6 leaking off. At point D, T1 again starts to conduct and, due to negative feedback, the grid of T1 is driven highly negative. Thus, tube T2 is conductive only for the time $t$ which is short compared to the total time.

Fig. 3 graphically illustrates the fluctuations of cathode voltage on both tubes T1 and T2 with respect to time. The symbol $e_{K1\ and\ 2}$ represents the voltage on the cathodes of tubes T1 and T2. It will be noted that the voltage on the cathodes rises for a short interval during time $t$. Since it is only in this interval that tube T1 ceases to conduct, it will be appreciated that tube T1 is conductive for all but a small part of the total time, while tube T2 is non-conductive for all but a small part of the total time.

Output is taken from the cathode of tube T2 as indicated in Fig. 1.

Tuned circuit 2 acts as a frequency stabilizing element, and functions to make the frequency of the pulses from tube T2 substantially independent of the usual voltage variations in the system, and also independent of the effects of undesirable variations in the constants of the circuit elements due to temperature changes.

From an inspection of Figs. 2 and 3, it will be seen that tube T2 produces pulses which are one-half the frequency of the oscillator T1. From a practical standpoint, by suitable selection of the values of condenser 6, resistor 1 and the other circuit elements T2 can produce pulses which are of the same frequency or at some suitable subharmonic of the frequency of operation of T1.

By way of example only, oscillator T1 can function at a frequency in the range of 25,000 cycles per second, while the pulses obtained from T2 can be a submultiple frequency or 12,500 cycles per second. When the system of Fig. 1 is used as a submultiple frequency pulse generator, the output pulse from T2 should be quite short or appreciably less than twenty percent of the total time to prevent any tendency for the pulse frequency to lock or entrain at the fundamental frequency of the oscillator T1.

In one embodiment of the invention tried out in practice, the resistor 4 had a value of 56,000 ohms, the condenser 5 had a value of 680 micro-microfarads, the condenser C had a value of 1400 mmf., the condenser 6 had a value of 220 mmf., the resistor 1 had a value of 3300 ohms, while the resistors 11, 12 and 13 had values of 12,000, 4,800 and 220,000 ohms, respectively. The voltage on the grid tap of potentiometer 7 was 9.0 volts positive, while the voltage available on the grid tap of potentiometer 8 was 3.0 volts positive.

The term "ground" used in the specification and claims is deemed to include any point of zero alternating current potential and is not limited to an actual earthed connection.

I claim:

1. A pulse generator system comprising first and second electron discharge structures each having an anode, a cathode and a grid, a stabilizing parallel tuned circuit of relatively low value of inductance and high value of capacitance coupled between the anode and grid of said first structure, a resistance-capacity network having a high impedance at the pulse frequency connected between a point on said parallel tuned circuit and a source of anode polarizing potential, a capacitive connection between the anode of the first structure and the grid of the second structure, a direct current connection between said cathodes, a common direct current impedance connecting said cathodes to ground, the constants of said systems being such that said first structure is conductive for all but a relatively short period of the total time, while said second structure is non-conductive for all but a relatively short period of the total time.

2. A pulse generator system comprising first and second electron discharge structures each having an anode, a cathode and a grid, a stabilizing parallel tuned circuit of relatively low value of inductance and high value of capacitance coupled between the anode and grid of said first structure, a resistance-capacity network having a high impedance at the pulse frequency connected between a point on said parallel tuned circuit and a source of anode polarizing potential, a capacitive connection between the anode of the first structure and the grid of the second structure, a direct current connection between said cathodes, a common resistor connecting said cathodes to ground, means for supplying the grids of said structures with positive potentials of different relatively small values, the value of the positive potential supplied to the grid of said first structure being larger than the value of the positive potential supplied to the grid of said second structure, the constants of said system being such that said first structure is conductive for all but a relatively short period of the total time, while said second structure is non-conductive for all but a relatively short period of the total time.

3. A pulse generator system comprising first and second electron discharge structures each having an anode, a cathode and a grid, a stabilizing parallel tuned circuit of relatively low value of inductance and high value of capacitance coupled between the anode and grid of said first structure, a resistance-capacity network having a high impedance at the pulse frequency connected between a point on said parallel tuned circuit and a source of anode polarizing potential, a capacitive connection between the anode of the first structure and the grid of the second structure, a direct current connection between said cathodes, a common resistor connecting said cathodes to ground, individual adjustable connections from the grids of said structures to a source of relatively small positive potential, the constants of said system being such that said first structure is conductive for all but a relatively short period of the total time, while said second structure is non-conductive for all but a relatively short period of the total time.

4. A pulse generator comprising first and second electron discharge structures, each having an anode, a cathode and a grid; a parallel tuned circuit of relatively low value of inductance and high value of shunt capacitance coupled between the anode and grid of said first structure, a source of anode polarizing potential, a connection including a relatively high value resistor connected between said source and a point intermediate the ends of said low value inductance, a relatively low value capacitance connecting the end of said last resistor which is nearest said tuned circuit to ground, a condenser connecting the anode of said first structure and the grid of said second structure, a direct current connection between said cathodes, a common resistor connecting said cathodes and ground, individual bias connections for said grids, the constants of said system being such that said first structure is conductive for most of the time, while said second structure is non-conductive for most of the time.

5. A pulse generator system comprising first and second electron discharge structures, each having an anode, a cathode and a grid; a parallel tuned circuit of relatively large Q coupled between the anode and grid of said first structure, a resistance-capacity network having a high impedance at the pulse frequency connected between a point on said parallel tuned circuit and a source of anode polarizing potential, a condenser connecting the anode of the first structure and the grid of the second structure, a direct current connection of low impedance between said cathodes, a common direct current impedance between said last connection and ground, individual bias connections for said grids, the bias for one grid being different than for the other grid, the constants of said system being such that said first structure is conductive for a large percentage of the total time, while said second structure is conductive substantially solely during the interval that the first structure is non-conductive.

6. A pulse generator system comprising first and second electron discharge structures each having an anode, a cathode and a grid, a parallel tuned circuit of relatively large Q coupled between the anode and grid of said first structure, a resistance-capacity network having a high impedance at the pulse frequency connected between a point on said parallel tuned circuit and a source of anode polarizing potential, whereby said first structure functions as an oscillator, a condenser connecting the anode of the first structure and the grid of the second structure, a direct current connection of low impedance between said cathodes, a common direct current impedance between said last connection and ground, individual bias connections for said grids, the bias for one grid being different than for the other grid, the constants of said system being such that said first structure is conductive for a large percentage of the total time, while said second structure is conductive substantially solely during the interval that the first structure is non-conductive, and an output circuit coupled to the cathode of said second structure, the pulse frequency obtained in said output circuit being a subharmonic of the frequency of operation of said first structure, the ratio of said frequencies being determined in part by the biases on the grids of said two structures.

7. A pulse generator system comprising first and second electron discharge structures each having an anode, a cathode and a grid, a stabilizing tuned circuit coupled between the anode and grid of said first structure, a resistance-capacity network having a high impedance at the pulse frequency connected between a point on said tuned circuit and a source of anode polarizing potential, a capacitive connection between the anode of the first structure and the grid of the second structure, a direct current connection between said cathodes, a common direct current impedance connecting said cathodes to ground, the constants of said systems being such that said first structure is conductive for all but a relatively short period of the total time, while said second structure is non-conductive for all but a relatively short period of the total time.

THOMAS L. GOTTIER.

REFERENCES CITED

The following references are of record in the file of this patent:

UNITED STATES PATENTS

| Number | Name | Date |
|---|---|---|
| 1,930,278 | Marrison | Oct. 10, 1933 |
| 2,113,165 | Young | Apr. 5, 1938 |
| 1,744,835 | Ohl | Jan. 28, 1930 |
| 2,300,996 | Vanderlyn | Nov. 3, 1942 |

FOREIGN PATENTS

| Number | Country | Date |
|---|---|---|
| 119,004 | Australian | Oct. 12, 1944 |